United States Patent Office 3,047,299
Patented July 31, 1962

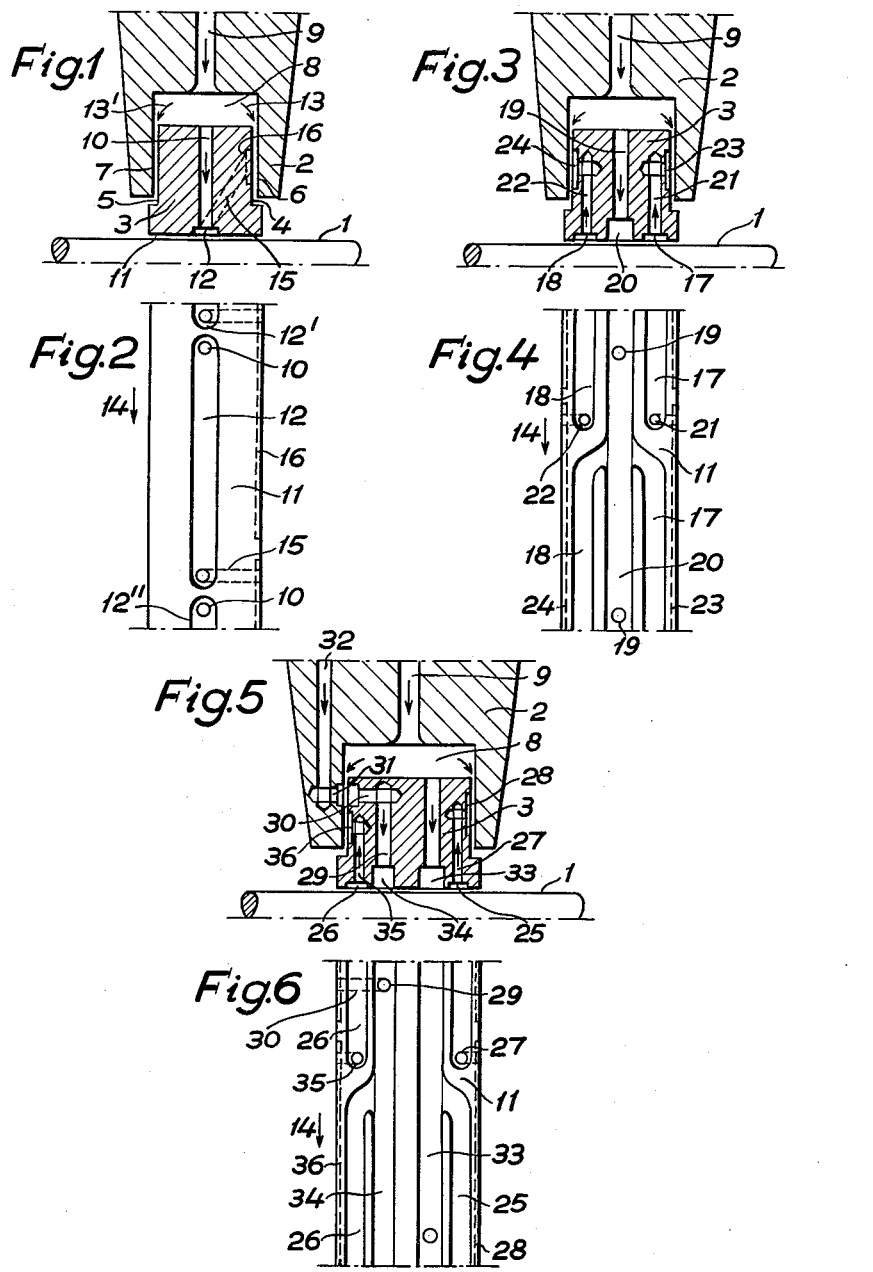

3,047,299
GLAND SEALS FOR GAS-FILLED ELECTRIC MACHINES
Olav Karsten, Vasteras, Sweden, assignor to Allmanna Svenska Elektriska Aktiebolaget, Vasteras, Sweden, a corporation of Sweden
Filed Dec. 8, 1959, Ser. No. 858,250
Claims priority, application Sweden Dec. 8, 1958
5 Claims. (Cl. 277—27)

This invention relates to gland-seals for gas filled electric machines such as hydrogen-cooled turbo-generators, particularly generators of the inner-cooled type which operate at high pressure.

To prevent the escape of hydrogen between the shaft of the machine and the gland-seal it is previously known to maintain a continuous film of sealing-liquid, such as oil in the gaps between the machine shaft and an annular seal-ring in an overlapping seal-housing. The sealing liquid at a pressure higher than the hydrogen pressure is fed to the gap between the shaft and the seal-ring and between the side walls of the seal-ring and the opposite overlapping side walls of the seal-housing, so that the sealing liquid flows towards the air side as well as towards the hydrogen side of the machine. In order to make this type of gland seal operate satisfactorily for high hydrogen pressure it is necessary to free the seal ring of distortion so that the seal ring can adjust itself to the various operating positions of the shaft, i.e. the seal ring must be a floating ring without binding contact with the shaft and the side walls of the seal housing, or in other words, the seal ring must be centered on the shaft and lifted from the side walls of the seal housing with the help of the film of sealing liquid under pressure. The above mentioned arrangement for a floating ring relies on a positive liquid supply under pressure to the gland seal to maintain the floating condition of the seal ring and the supply system is very complicated and expensive.

The present invention relates to means for generating in the gland seal itself the necessary liquid pressure for centering and floating the seal ring, so that the supply system, in an uncomplicated and inexpensive way, only has to deliver sealing liquid at a relatively low pressure to the gland seal. More specifically the invention provides viscosity pumping grooves arranged on the shaft encircling surface of the seal ring in which the liquid pressure generates from the hindermost ends of the grooves to the foremost ends of the grooves seen in relation to the direction of rotation of the machine shaft.

This and other objects of the invention will become apparent from the following description of several exemplary embodiments thereof, illustrated in the accompanying drawing wherein:

FIGURE 1 is a diagrammatic sectional view of a part of the top half of one of the gland seals, FIGURE 2 is a plane view of a part of the shaft encircling surface of the seal ring in FIGURE 1, and FIGURES 3, 4, 5 and 6 are views corresponding to FIGURES 1 and 2, showing further modifications of the gland seals.

In the figures, the left and right sides respectively of the gland seal represent the gas and air sides of the seal. In FIGURES 1 and 2, 1 designates a shaft end of a rotor member of the electric machine and 2 designates a seal housing in a gas-tight machine-housing which is filled with hydrogen or other gaseous filling at an internal gaseous pressure which is at times considerably higher than the ambient atmospheric pressure. The shaft end 1 is encircled by an annular seal ring 3 with side walls 4 and 5. The seal-ring 3 is held within a pocket in the seal-housing 2, which has an outer side wall 6 overlapping a portion of the outer wide wall 4 of the seal-ring on the air side of the seal, and an inner side wall 7 overlapping a portion of the inner side wall 5 of the seal ring on the gas side of the seal. The seal-ring and the seal-housing also provide an annular chamber 8 which surrounds the outer periphery of the seal-ring 3. The seal-ring encircles the shaft 1 with a gap of small clearance and spaces of small clearance are also provided between the walls 4 and 6, and 5 and 7 respectively of the seal ring 3 and seal-housing 2. Liquid under pressure is supplied to the chamber 8 through a passage in the seal-housing and through passages 10 in the seal-ring 3 to the gap between the shaft and seal-ring. On the shaft encircling surface 11 of the seal-ring are arranged circumferentially at least three coaxial viscosity pumping grooves 12, 12' and 12", said grooves being disposed symmetrically along the surface of the seal-ring and all of the grooves lying within the surface 11. The said passages 10 communicate with the hindermost ends of the grooves in relation to the direction of rotation of the shaft and because of the viscosity pumping effect created in these grooves during rotation of the shaft, the rotation direction being indicated with an arrow 14 in FIGURE 2, a very high liquid pressure is developed in the grooves, the said pressure successively increasing in the direction of the foremost ends of the grooves. The high pressure generated in these grooves, which are symmetrically disposed along the surface 11 of the seal-ring 3, gives a very satisfactory centering or floating of the seal-ring on the shaft 1 with a relatively low pressure in the sealing-liquid supply system. The spaces between the side walls 4, 6 and 5, 7 of the seal-ring and seal-housing are continuously supplied with sealing-liquid from the chamber 8 as the arrows 13 and 13' show.

If the pressure of the sealing-liquid supplied to the spaces between the walls of the seal-ring and seal-housing from the chamber 8 is not high enough, a higher pressure can be developed in these spaces by leading the sealing-liquid through passages 15 (in broken lines) in the seal-ring from the foremost ends of said viscosity pumping grooves 12, 12' and 12" to the side walls of the seal-ring 3. These passages 15 can communicate with symmetrically disposed grooves 16 or chambers lying within the side wall surface of the seal-ring. In FIGURE 1, the passages 15 are shown leading only to the air side of the seal as the seal-ring tends to move against the seal-housing on the air side because of the gas pressure on the side wall of the seal-ring on the gas side of the seal.

In FIGURES 3 and 4 is shown another embodiment of the invention in which two parallel groups of viscosity pumping grooves 17 and 18 are disposed circumferentially on the shaft encircling surface 11 of the seal-ring 3. Through passages 19 the sealing-liquid is fed to a distribution groove 20 in the seal-ring surface 11, which groove 20 communicates with the hindmost ends of the viscosity pumping grooves 17 and 18. From the foremost ends of the said grooves 17 and 18 lead passages 21 and 22 to chambers or grooves 23 and 24 in the side walls of the seal-ring 3. This arrangement gives a double centering or floating effect for the seal-ring in the gap between the shaft and the seal-ring and an effective high pressure sealing-liquid film, for floating purposes, in the spaces between the side walls of the seal-housing and the seal-ring.

In FIGURES 5 and 6 is shown another embodiment of the invention in which two systems for the sealing-liquid are used, one for the air side and one for the gas side of the gland seal. Two parallel groups of viscosity pumping grooves 25 and 26, each group containing at least three grooves, are disposed circumferentially on the shaft encircling surface 11 of the seal ring 3. The grooves 25 in one of the groups are fed with sealing-liquid from the chamber 8 as before in FIGURES 1 and 3, and through passages 27 in the seal-ring 3 the sealing-liquid is fed from the foremost ends of these grooves 25 to chambers 28 or grooves in the side wall of the sealing ring, the said wall being preferably on the air side of the seal. The grooves 26 in the other group are fed with sealing-liquid from passages 29 and 30 in the sealing-ring 3 and corresponding passages 31 and 32 in the seal-housing 2, the said passages 30 and 31 communicating in the space between the gas side side-walls of the seal-ring and the seal-housing. By this arrangement the interchange of sealing-liquid on the air and gas sides is kept to a very small value. In FIGURES 5 and 6 distribution grooves 33 and 34 are arranged for each of the groups of the viscosity pumping grooves 25 and 26, and passages 35 from the foremost ends of the grooves 26 to chambers 36 on the gas side wall of the seal-ring 3 are arranged in the seal-ring.

Various changes and modifications can be made without departing from the spirit of the invention for example more than two groups of viscosity pumping grooves could be disposed on the shaft encircling surface of the seal-ring and the grooves could be disposed in a spiral formation thereby partly overlapping each other when seen in the direction of the axis of the shaft.

I claim:

1. A gland seal for a gas filled electric machine having a shaft and a seal housing around the shaft, comprising an annular seal-ring fitted within the housing and encircling the shaft with a small clearance, the inner surfaces of the inner and outer side walls of said housing overlapping parts of the respective inner and outer side surface of said seal-ring, thereby defining two spaces of small clearance between said walls and providing an annular chamber surrounding the outer periphery of said seal-ring, means to supply said chamber with sealing liquid under pressure, said seal-ring having a plurality of circumferentially disposed grooves in its shaft-facing surface, and means including passages in the seal-ring communicating with the ends of said grooves lying hindmost in relation to the direction of rotation of the shaft and with said annular sealing chamber to supply sealing liquid to said grooves, said last means forming the only direct communication between the annular chamber and the grooves.

2. A gland seal according to claim 1, in which the grooves include two parallel groups of pumping grooves between which is disposed a distribution groove forming a part of said last means and communicating with the passages and with the hindmost ends of the pumping grooves.

3. A gland seal according to claim 1, in which the foremost ends of said pumping grooves communicate through passages in the seal-ring with at least one of said spaces between the side walls of the seal housing and the seal-ring, the side wall of the seal-ring having grooves therein with which said last passages communicate.

4. A gland seal for a gas filled electric machine having a shaft and a seal housing around the shaft, comprising an annular seal-ring fitted within the housing and encircling the shaft with a small clearance, the inner surfaces of the inner and outer side walls of said seal housing overlapping parts of the respective inner and outer side surfaces of said seal-ring, thereby defining two spaces of small clearance between said walls and providing an annular chamber surrounding the outer periphery of said seal-ring, means to supply said chamber with sealing liquid under pressure, said seal-ring having a group of at least three circumferentially disposed pumping grooves in its shaft-facing surface, means including passages in the seal-ring connecting the ends of said grooves lying hindmost in relation to the direction of the rotation of the shaft with said annular chamber to supply sealing liquid to said grooves, said last means forming the only direct communication between the annular chamber and the grooves, said seal-ring having a second group of pumping grooves arranged parallel with said first group in its shaft-facing surface, the seal-ring having a plurality of passages connecting the hindmost ends of the grooves of said second group with one of said spaces, and means in the seal housing to furnish fluid under pressure to said last passages.

5. A gland seal according to claim 4, in which the foremost ends of said pumping grooves, through passages in the seal-ring, communicate with the spaces between the said opposite side walls of the seal-ring and the seal housing, one group of said grooves communicating at their foremost ends with one of said spaces, and the other group of said grooves communicating with the other of said spaces, the said passages communicating with grooves in the side walls of the seal-ring.

References Cited in the file of this patent

UNITED STATES PATENTS 1,689,874     Jabs _____ Oct. 30, 1928

FOREIGN PATENTS 1,109,866     France _____ Feb. 2, 1956